UNITED STATES PATENT OFFICE 2,511,609

DIETARY FROZEN FRUIT AND METHOD OF MAKING THE SAME

Clair A. Weast, Manteca, Calif.

No Drawing. Application September 17, 1948,
Serial No. 49,849

13 Claims. (Cl. 99—193)

The present invention relates to dietetic foods; and more particularly to dietetic frozen fruits and methods of making the same.

Diabetics, the obese, and others who must restrict their intake of carbohydrates are thereby deprived from eating foods prepared with sugar, such as fruits frozen in sugar syrup. Since many foods are not particularly palatable unless sweetened, the existence of such persons is made drab by the flat taste of their diets. Particularly is this the case with fruits canned in water, for the added water leaches part of the natural sugars and other flavors out of the fruit, thus creating a disappointing mixture of insipid fruit in insipid slightly sweetened and but faintly flavored water. With frozen fruits, the situation is even worse. Since the frozen product is not hermetically sealed, a barrier to oxygen transfer must be provided; otherwise the air will discolor the fruit until it is not salable, and simultaneously destroy the vitamin C content thereof. Sugar syrup is ordinarily the packing medium of choice for this purpose. Frozen fruits are not packed in water for consumption as such. The present unavailability of unsweetened frozen fruits often deprives diabetics of an adequate year round source of vitamins, minerals, and other food constituents normally present in raw fruit.

The use of saccharin to artificially sweeten foods of course is well known, and it has been long established that saccharin is safe for such use. Unfortunately, saccharin leaves a bitter aftertaste when imbibed in concentrations greater than about 0.01%; and it has a bitter taste to some individuals in even far smaller concentrations. An even worse disadvantage of saccharin is that many foods, particularly fruits and fruit juices, when sweetened therewith, become bitter on standing or cooking. The existence of this property has led away from frozen fruit containing saccharin, and such products hitherto-fore have not been manufactured. Until my invention, it was not known that palatable frozen fruits containing saccharin could be made.

I have now discovered, surprisingly enough, that fruits and the like frozen with both saccharin and added pectin have a palatable sweet taste free from the upleasant by-taste of saccharin. This coaction of pectin and saccharin is most unexpected, for the pectin inhibits the characteristic bitter taste of the saccharin without affecting the sweet taste thereof. The conjoint incorporation of pectin and saccharin in foodstuffs (a) minimizes or eliminates the characteristic by-taste which some people encounter from saccharin; (b) permits the use of saccharin by normal-tasting persons in concentrations greater than 0.01% and as high as 0.05% without unpleasant after-taste; and (c) stabilizes the artificially sweetened food so that it does not become bitter upon cooking or standing.

According to one embodiment of the invention, saccharin is incorporated into the frozen product in amount just sufficient to compensate for the dilution of the natural sweetness of the fruit by the added packing medium, so that the final product has a degree of sweetness corresponding to that of the fresh raw fruit on the tree.

A further advantage of the present invention is that pectin, in the proportions utilized in accordance with the present invention for coaction with saccharin, also has the highly desirable effect of inhibiting oxygen transfer to the fruit, thereby retarding discoloration of the fruit and destruction of its vitamin C content.

Frozen fruit containing saccharin in combination with pectin may be further protected against discoloration by the incorporation of added vitamin C. The flavor thereof is sometimes improved by the addition of citric acid to increase the tartness and by contrast, to emphasize the sweetness of the saccharin.

Accordingly, it is a principal object of the present invention to provide artificially sweetened frozen foods which are stable and do not become bitter upon thawing, standing, or cooking.

A more specific object is to provide dietetic frozen fruits containing no added sugar, sweetened with a mixture of saccharin and pectin, and characterized by flavor stability and freedom from undesirable side-taste or after-taste.

Another object is to provide practical methods of making by new improved dietetic foods.

Still another important object is to provide novel methods of inhibiting the disagreeable taste of saccharin in frozen fruits.

In the case of frozen fruits generally, the objectives of my invention are achieved by incorporating pectin in amounts from about 10 to about 40 times the saccharin content. The saccharin may vary from as low as 0.01% to as high as 0.075% of the weight of the finished product. The preferred commercial frozen fruits embodying my invention contain from 0.01% to 0.06% saccharin, together with from 0.4% to 1.0% pectin.

In frozen fruits, substantial flavor stabilization is apparent when the pectin content of the fruit is 10 times the saccharin content thereof; but edible and desirable formulations may be obtained with higher ratios, such as 40 parts of pectin to one of saccharin.

As used in this specification and the appended claims, the term saccharin includes both ordinary saccharin

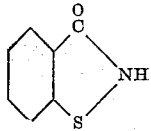

and soluble saccharin (saccharin sodium)

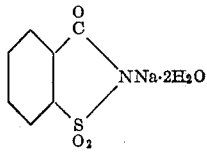

Ordinary saccharin is soluble to the extent of 0.43 gram per 100 cc. water at 25° C. If it is desired to use a greater concentration of ordinary saccharin in the packing medium, it is necessary to warm said medium sufficiently to dissolve all said saccharin, or else to use soluble saccharin.

I have prepared and tested, and many people have eaten, many forms of my invention, including by way of example, dietetic frozen fruits such as apricots, peaches (both freestone and clingstone), pineapple, and boysenberries; and various mixtures of the foregoing and other fruits.

In order more fully to disclose the invention, even to details, the following examples are recited by way of illustration and not of limitation.

EXAMPLE I.—DIETARY FROZEN APRICOTS

Mature apricots are pitted and halved, graded for size, washed, and sorted in accordance with standard commercial practice. The fruit is filled into suitable containers, and covered with liquid medium. A suitable liquid medium is made by boiling 40 grams of 150 grade rapid setting citrus pectin and 2 grams saccharin sodium in water to make one gallon. This gives a liquid medium analyzing 1.06% pectin and 0.053% saccharin.

The filled containers are quick frozen in accordance with conventional commercial practice. After complete thawing, the fruit exhibits the color and texture typical of ordinary commercial quick frozen apricots in syrups. The product corresponds in sweetness to apricots frozen in light sugar syrup, but the viscosity of the liquid drained from the thawed fruit at room temperature is somewhat greater than that of the liquid drained from apricots frozen in heavy syrup. To persons of normal taste response, the product is free of bitter by-taste and bitter after-taste, and remains so even when stored at 0° F. for periods of many months.

A typical run of my dietetic frozen apricots prepared as above described analyzed as follows:

Table I.—Analysis of dietetic frozen apricots

| | | |
|---|---|---|
| Pectin | per cent | 0.95 |
| Saccharin | do | 0.018 |
| Carbohydrate | do | 8.5 |
| Protein | do | 0.65 |
| Fiber | do | 0.39 |
| Ash | do | 0.39 |
| Water | do | 88.602 |
| Calories per 100 grams | | 42 |
| Calories per pound | | 190 |

It is to be noted that the pectin and saccharin content of the finished product is quite different from that of the liquid medium in which the raw fruit was packed, because during storage and thawing the saccharin and pectin become distributed through both the fruit and the aqueous packing medium.

The procedure of Example I may be applied to the production of dietetic frozen apricots in other forms, such as slices, cubes, or whole fruit, and also to the preparation of dietetic canned cherries, peaches, pineapple, nectarines, etc. The proportion of saccharin of course may be varied to suit the taste, and the proportion of pectin adjusted accordingly. Any pectin of food grade may be employed. Commercial pectin is ordinarily standardized to the declared grade by dilution with dextrose. The minute quantity of carbohydrate thus introduced into the dietetic food is physiologically negligible; nevertheless if desired, the pectin may be standardized with a non-carbohydrate filler. Optionally, ascorbic acid may be incorporated into the frozen fruit to further retard oxidative discoloration. One convenient way to do this is to dissolve ascorbic acid in the liquid packing medium in amount about 0.1% of the weight of said liquid packing medium.

EXAMPLE II.—DIETARY FROZEN PEACHES

Peeled sliced peaches are filled into suitable containers; each 4 pounds of fruit is covered with one pound of the liquid packing medium described in connection with Example I; and frozen as described in Example I.

A typical batch of dietary frozen peaches prepared according to Example II was found, upon chemical analysis, to have the following composition and properties:

Table II.—Analysis of dietary frozen peaches

| | | |
|---|---|---|
| Pectin | per cent | 0.65 |
| Saccharin | do | 0.015 |
| Carbohydrate | do | 8.4 |
| Protein | do | 0.35 |
| Fiber | do | 0.42 |
| Ash | do | 0.35 |
| Water | do | 89.915 |
| Calories per 100 grams | | 35 |
| Calories per pound | | 156 |

EXAMPLE III.—DIETARY FROZEN PINEAPPLE

A suitable liquid medium is prepared by dissolving 15 pounds of 150 grade pectin and 12 ounces of soluble saccharin in enough water to make 100 gallons. This liquid medium analyzes 1.8% pectin and 0.09% saccharin.

The pineapple is graded, sorted, washed and diced in accordance with typical commercial practice. The fruit is filled into containers, covered with the liquid medium, and frozen.

The dietary product thus obtained corresponds in sweetness to raw pineapple. To persons of normal taste response, the product is free of bitter by-taste and bitter after-taste, and remains so even when stored in the sealed container for periods of many months.

A typical run of my dietary frozen pineapple prepared according to Example III analyzed as follows:

Table III.—Analysis of dietary frozen pineapple

| | | |
|---|---|---|
| Pectin | per cent | 0.75 |
| Saccharin | do | 0.022 |
| Carbohydrate | do | 10.5 |
| Protein | do | 0.15 |
| Fiber | do | 0.30 |
| Ash | do | 0.15 |
| Water | do | 88.128 |
| Calories per 100 grams | | 43 |
| Calories per pound | | 195 |

EXAMPLE IV.—DIETARY FROZEN SLICED STRAWBERRIES

One pound of soluble saccharin is uniformly distributed through 20 pounds of 150 grade pectin, thereby forming a dry sweetening powder. Sliced strawberries are liberally dusted with this powder, and then immediately frozen to 0° F. The resultant dietary product is comparable in sweetness and keeping qualities to the ordinary pack of sliced strawberries frozen in sugar without added water.

From the foregoing detailed concrete examples, persons skilled in the art will have no difficulty in preparing dietary frozen fruits in accordance with the precepts of the present invention.

Having thus disclosed improved methods of eliminating the undesirable side-taste of saccharin, methods of preparing dietary frozen fruits which are taste-stable and free of said undesirable side-taste, and dietary frozen fruits resulting from the application of my improved processes and concepts, I claim:

1. Frozen fruit containing from 0.01% to 0.075% saccharin, and added pectin in amounts from 10 to 40 times the saccharin content.

2. Frozen fruit containing from 0.02% to 0.075% saccharin, and from 0.2% to 2% added pectin.

3. Frozen fruit containing saccharin in amounts from 0.01% to 0.075% of the total weight of said fruit, and pectin in amount at least 10 times the weight of said saccharin.

4. Dietary frozen apricots containing about 0.02% saccharin and about 1% pectin.

5. Frozen strawberries containing substantially no added sugar and water, and containing both saccharin and added pectin, wherein the pectin content is about 20 times the saccharin content.

6. Dietary frozen pineapple containing from 0.01% to 0.05% saccharin, and from 10 to 40 times as much pectin as saccharin.

7. Dietary frozen pineapple containing substantially no added sugar, and containing approximately 0.02% saccharin and approximately 0.75% pectin.

8. A dietary frozen food comprising peaches, water, pectin and saccharin, wherein the saccharin content is 0.01% to 0.05% of the whole, and the pectin content is at least 10 times the saccharin content.

9. Dietary frozen peaches containing substantially no added sugar, and containing approximately 0.015% saccharin and approximately 0.65% pectin.

10. The method of inhibiting undesirable taste in frozen fruits sweetened with saccharin, which comprises adding thereto pectin in amounts from 10 to 40 times the saccharin content thereof.

11. The method of inhibiting the disagreeable by-taste of saccharin in apricots frozen therewith, which comprises incorporating added pectin therewith in an amount approximating 20 times the weight of said saccharin.

12. The method of inhibiting the disagreeable after-taste of saccharin in peaches frozen therewith, which comprises incorporating pectin therewith in an amount approximating 40 times the weight of said saccharin.

13. The method of preventing bitter taste in strawberries frozen with saccharin, which comprises incorporating therewith an amount of pectin at least 10 times as great as the quantity of saccharin.

CLAIR A. WEAST.

REFERENCES CITED

The following references are of record in the file of this patent:

UNITED STATES PATENTS

| Number | Name | Date |
|---|---|---|
| 851,221 | Chaplin | Apr. 23, 1907 |
| 2,137,205 | Congill | Nov. 15, 1938 |